Nov. 25, 1941.   J. C. KEANEY   2,263,848
GLASS FURNACE
Filed Jan. 11, 1941   2 Sheets-Sheet 1
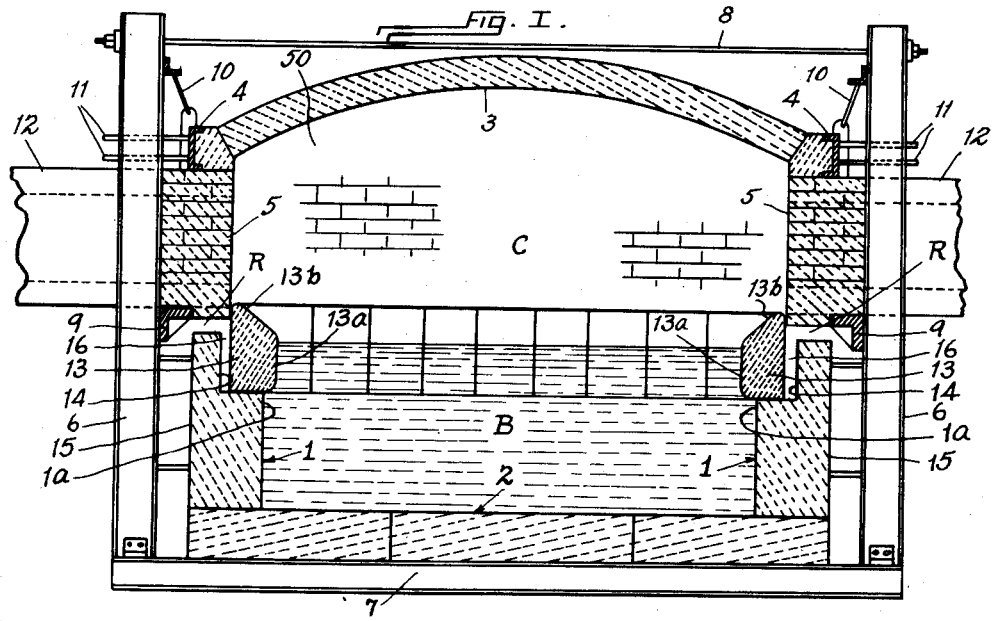
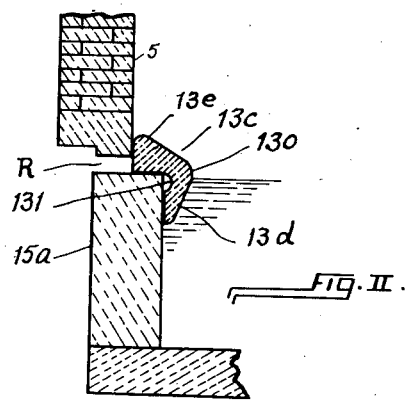
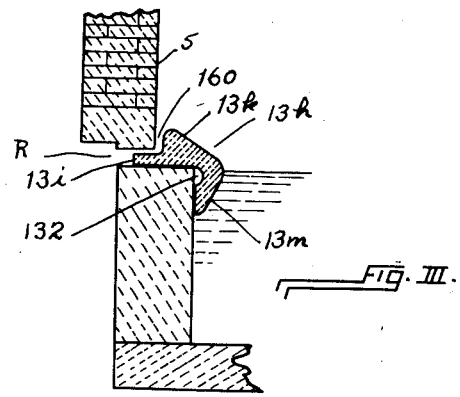
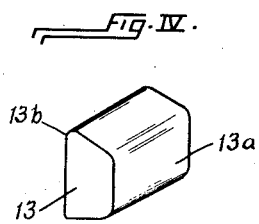
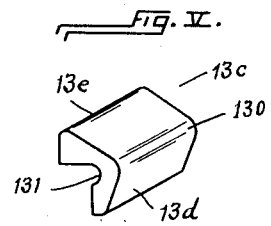
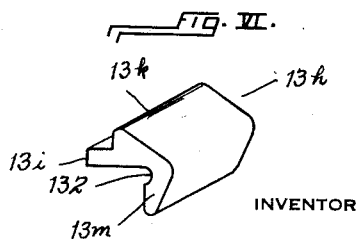
INVENTOR
Joseph C. Keaney Nov. 25, 1941.   J. C. KEANEY   2,263,848
GLASS FURNACE
Filed Jan. 11, 1941   2 Sheets-Sheet 2
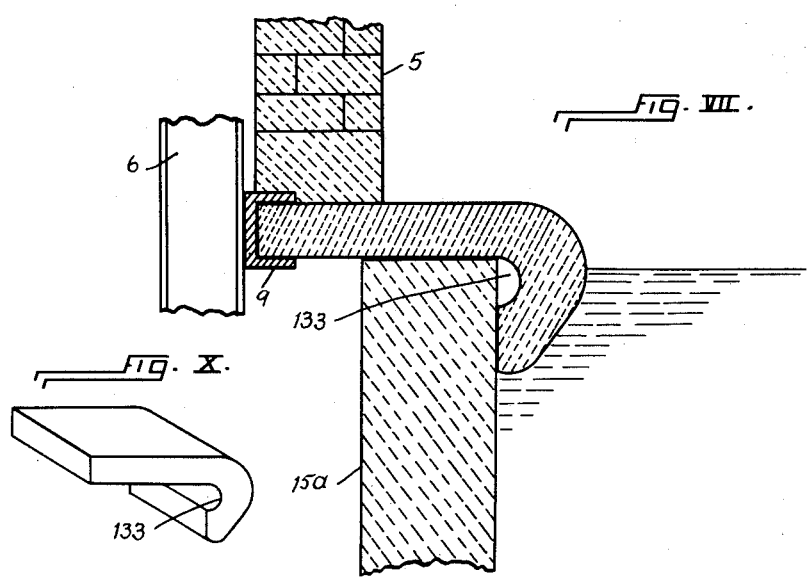
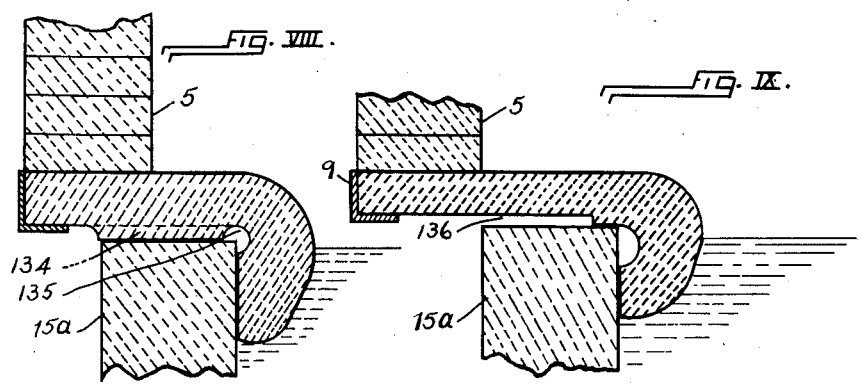
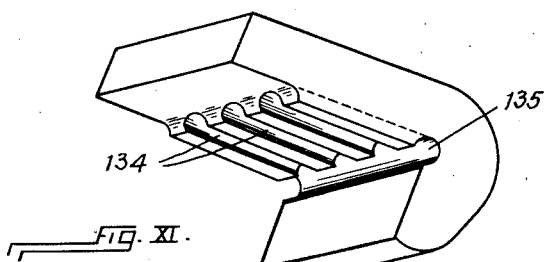
INVENTOR
Joseph C. Keaney Patented Nov. 25, 1941

2,263,848

UNITED STATES PATENT OFFICE 2,263,848

GLASS FURNACE

Joseph C. Keaney, Mount Lebanon, Pa.

Application January 11, 1941, Serial No. 374,042

15 Claims. (Cl. 49—54)

My invention relates to glass furnaces or tanks, and consists in a refinement in construction. The application for these Letters Patent consisted in a continuation in part of an application, Serial No. 316,574, filed by me on January 31, 1940.

It is a matter of common knowledge in the art that the hot bath of molten glass in a glass furnace erodes the refractory side walls of the hearth or tank in which it is contained. This deleterious action of the glass is most acute at and immediately below the metal line, that is, the peripheral line on which the surface of the bath makes contact with the side walls of the tank. In consequence the tank walls, being elsewhere than at the metal line in condition for continued service, are rendered unfit for furnace operation. It has long been realized that if the refractory side walls of a glass furnace tank were constructed in such a manner as to render the tank more enduring at the metal line, the life of the tank and the campaign of the furnace would be greatly increased, with manifest advantages and economies. And over a period of years various such constructions have been proposed, but so far as I am aware none has proved adequately successful.

The object of my invention is to provide an economical and practical solution of the problem, and, with such desideratum in mind, it is to be understood that the invention consists in certain refinements and elaborations in the construction of glass tanks, whereby the side walls of the tanks are more durable at their rims, the regions where the deleterious action of the contained bath of molten glass is greatest.

In the accompanying drawings Fig. I is a view in vertical section of a glass furnace embodying the invention; Fig. II and Fig. III are fragmentary cross sectional views of the furnace, illustrating two permissible modifications; Figs. IV, V, and VI are views in perspective of refractory blocks used in the structures of Figs. I, II, and III, respectively; Figs. VII, VIII and IX are views generally similar to Figs. II and III, but to larger scale, illustrating still other modifications; and Figs. X and XI are views in perspective of the blocks used in the structures of Figs. VII and VIII, respectively.

Referring to Fig. I of the drawings, the furnace in which I have chosen to describe the invention includes a glass-refining chamber C. The hearth is a rectangular hearth in this case, having vertical side walls 1 and a floor or bottom 2; such hearth is built of refractory blocks, and is adapted to sustain a bath B of molten glass in process of refinement. The roof of the chamber consists in the usual arched brickwork dome 3 extending between skew-backs 4, and, as usual, vertical jamb walls 5 are arranged between the rim of the hearth and the springs of the roof arch. The refractory structure is externally supported and reinforced by means of a framework of structural steel. Such framework includes buckstays 6 in conventional arrangement at the sides of the furnace; the buckstays are secured at their lower ends to basal beams 7, and are cross-connected at their upper ends by means of tie-rods 8; the weight of the jamb walls 5 is borne by brackets 9 that are rigidly bolted to the buckstays, while the stress imposed by the roof 3 upon the skew-backs 4 is sustained by hangers 10 and thrust screws 11. The usual ports 12 for the firing of the furnace and the elimination of combustion products open through the jamb walls 5.

In accordance with well-known practice the roof 3, end walls 50, and jamb walls 5 may be constructed of bricks or blocks of a siliceous refractory material, a material that typically includes upwards of 95% silica, with a bonding substance such as lime or clay. The bricks and blocks made of such siliceous refractory material are inexpensive; they are characterized by high compressive strength and integrity under the thermal and chemical conditions prevailing above the bath of molten glass in the furnace, and present no serious problems in furnace maintenance.

The situation is not so simple in the case of the hearth. The provision of an enduring hearth structure presents a problem that has not, hitherto, been adequately solved. It will be understood that the bath of molten glass in the furnace operates both chemically and thermally in disintegrating the bath-confining side walls 1 of the hearth. Furthermore, the slowly circulating currents of glass within the bath add mechanical attrition to the deleterious chemical and thermal influences to which such hearth walls are exposed. While it is possible to construct the hearth of special refractory blocks that will withstand these conditions over relatively long periods of service, the fact is that such blocks are very expensive, so expensive, indeed, that most furnace operators have found it practically essential to use less costly blocks, say blocks formed of alumina-silica, such as a mixture of kaolinite

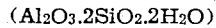

($Al_2O_3.2SiO_2.2H_2O$)

and plastic fire clay; or a fire clay alone; or monolithic blocks of unfired sandstone; or other forms of "flux blocks" known and used in the art today. In service these relatively inexpensive blocks must be renewed on an average of from six to ten months, depending upon the type of glass undergoing treatment in the furnace, and needless to say this necessitates that the furnace be withdrawn from service, cooled down, and rebuilt, with accompanying losses in time and money.

In accordance with the invention, I so organize a belt or bustle of specialized refractory blocks at the rim of the side walls of a hearth as to render the hearth, otherwise constructed of known inexpensive and relatively unenduring blocks, durable and adequate over long campaigns of furnace operation. A hearth normally effective for from six to ten months thus becomes serviceable and efficient for periods upwards of two years or more, and this increase in life is gained at a relatively small increase in cost of furnace construction.

More particularly, I provide at the periphery or rim of the hearth, which is otherwise constructed of blocks of the above-mentioned inexpensive refractories, a belt or bustle formed of blocks of a refractory material that is heavier than molten glass and that is hard and wear-resistant under the deleterious influences of the hot bath of molten glass. Specifically, such refractory materials as are now known in the art as Corhart, or Sillimanite, or Monofrax are excellent for the purpose.

Corhart consists in the main of a mixture of diaspore or calcined bauxite and clay or kaolin. The mixture is smelted in an electric furnace and cast into blocks in molds made of sand, bonded with linseed oil. The final product approaches mullite ( 72 $Al_2O_3$ and 28 $SiO_2$) in composition. Sillimanite consists in $Al_2O_3$ and $SiO_2$, in the approximate proportions of 62.9% and 37.1%, respectively. And the following three analyses are typical of Monofrax:

| | I | II | III |
|---|---|---|---|
| | Per cent | Per cent | Per cent |
| $Al_2O_3$ | 94.50 | 93.00 | 86.00 |
| $Cr_2O_3$ | | | 6.00 |
| $Fe_2O_3$ | .10 | 3.00 | 5.00 |
| $MgO$ | | 3.00 | |
| $Na_2O$ | 5.00 | | |
| $SiO_2$ and $TiO_2$ | Balance | Balance | Balance |

The bustle blocks 13, constructed of such a refractory material, are arranged at the rim of the hearth, with their effective faces 13a directed inward of the furnace, providing the immediate glass-contacting face or faces of the hearth at the surface of the molten bath B, and for a substantial interval below such surface. The peripheral belt or bustle formed of the refractory blocks 13 extends in a plane paralleling the surface of the bath; the bustle blocks may be said to be centered in a plane approximately coincident with the plane of the surface of the bath, and advantageously the bodies of such blocks project inward and upward with respect to the glass-sustaining surface portions 1a of the hearth side walls immediately below the bustle. That is to say, the course of bustle blocks may, advantageously, if not essentially, be formed and arranged inwardly to overhang the supporting hearth walls 1, with the effect that the surface of the bath, which is exposed to burning fuel in chamber C above, is of less area than the body of the bath below the belt or bustle.

The bustle blocks 13 are formed with upwardly tapering body portions 13b; in the furnace structure these tapering portions 13b extend upward from the block portions that provide the immediate glass-confining structure at the rim of the tank or hearth and extend upward from such rim of the hearth and bridge the intervals or regions R between the lower edges of the jamb walls and the hearth rim. The block portions 13b may extend above the lower edges of the jamb walls, and may be arranged to overlie the inner faces of such walls, as shown. The bustle blocks are advantageously, if not essentially, borne by the side walls of the tank or hearth. In the embodiment illustrated in Fig. I, reentrant recesses 14 are formed in the side-wall blocks 15, and these recesses are of such lateral or horizontal extent that snug contact of block portions 13b with the jamb walls may be effected. In some cases clearances 16 will remain between the bodies of blocks 13 and 15, and these clearances, together with the intervals or clearances (R) between the rim of the hearth and the jamb walls, may be filled with a sealing body of sand, or with a plastic refractory material. Again, the clearances 14 may be left open, to gain the beneficial cooling effect of the outer air.

Figs. II to XI illustrate that the bustle blocks may be more elaborate in structure, and that the refractory wall-forming members 15a of the hearth may be made, as has been hitherto customary, in the form of simple, rectangular cubes or blocks. The bustle blocks 13c of Fig. II are less massive than the blocks 13 first described. The blocks 13c include apron portions 13d that extend from the hearth rim downward upon the inner surfaces of the hearth side walls, to a line below the surface of the bath. The blocks 13c are seated upon the rim of the hearth, with the apron portions 13d suspended in secure position upon said inner surfaces of the hearth walls, while tuck portions 13e rise from the surface of the molten bath through such vertical interval as is required to cover the clearance regions R between the hearth rim and the lower edges of the jamb walls 5. It is important to note that the apron portion 13d of each monolithic bustle block extends from its lower edge inward of the tank and upward, meeting the tuck portion 13e of the block in a rounded ridge 13g, with the consequence and effect that the assembly or peripheral succession of bustle blocks provides a belt or bustle that, as viewed in cross section, is bellied inward at the surface of the contained pool of molten glass. It is further important to note that elsewhere the bodies of the bustle blocks are designed with rounded corners, so that they will be better able to withstand the thermal and mechanical stresses and strains both during the manufacture of the blocks and during the periods of service in the glass furnace. And it is particularly important to note that the blocks each include a semi-cylindrical recess 13f that serves to avoid the presence of a sharp corner in the region of the body of the block in which the vertically extending apron portion 13d joins the horizontally extending portion that overlies the top edge of the hearth wall 15a. By virtue of this recess 13f, "corner" strains are eliminated or neutralized when the block is in service, and the tendency for the block to crack or break in said corner region of its body is reduced to a minimum. In addition the recess 13f provides an air channel between the bustle block and the hearth side-wall block, and in consequence there is afforded in the assembled band or bustle of blocks 13c a beneficial distribution and dissipation of heat, such that the blocks at the surface of the bath are safeguarded from localized overheating. Further, the mean temperature of the blocks at the metal line is lower, and the tank structure enjoys a longer life than otherwise would be the case.

It will be perceived that the tuck portions 13e of the bustle blocks form with the inner surface of the jamb wall against which they abut a V-shaped groove, and it will be understood that this groove may be filled with a suitable lute, such as sand.

The bustle blocks 13h of the structure illustrated in Fig. III are further elaborated by the provision of tongue portions 13i that are adapted to extend into the intervals R between the jamb walls and the rim of the hearth, and it is contemplated that in some cases these tongue portions will eliminate the need of the tuck portions 13k. If, in adjusting the bustle blocks 13h with their apron portions in snug contact with the inner surfaces of the wall blocks 15a, spaces 160 should remain between the tuck portions and the jamb walls, a filler of sand, or other suitable lute, may be introduced. If, on the other hand, with the tuck portions 13k positioned snugly upon the jamb walls, crevices remain between the apron portions and the wall blocks 15a, glass from the bath will rise a slight distance in the crevices and freeze, to provide the desired integrity of structure. The blocks 13k include rounded channels 132, similar to and for the purposes of the channels 131 of the blocks 13c of Fig. II.

The horizontal body portions of the tank-protecting bustle blocks of Figs. VII to XI are designed to close the interval between the jamb walls and the rim of the hearth or tank, and, if desired, they may be supported (as here shown) at their outer edges by means of the steel brackets or beams 9. As in the case of the bustle blocks already described, the blocks of Figs. VII to XI include apron portions that extend downward from the horizontal portions and overlie the inner surface of the tank at the metal line. And in the region of mergence of the two angularly extending body portions, each block is outwardly bellied and inwardly recessed, eliminating sharp corners. The recesses in the blocks provide in the assembly an air pocket or channel that extends between the glass-contacting faces of the blocks and the side wall of the tank. The air channel may be a substantially enclosed channel, as indicated at 133 in Fig. VII; alternately, as shown in Figs. VIII and XI, the bodies of the blocks may include grooves 134 that form air passages opening into the recesses or channel 135. In the assembled structure the grooves or passages 134 establish communication between the air channel 135 and the outer atmosphere.

The recesses described provide for a distribution and dissipation of heat at the metal line of the tank structure, and serve to prevent a localized and harmful overheating of the refractory material in this critical region. The air passages formed by the grooves 134 in the structure of Figs. VIII and XI assist in achieving this end. In some cases it may be desirable that the outside atmosphere shall not be in open communication with the air channel that is arranged between the molten glass and the tank side wall, in which event the blocks may be formed as shown in Fig. IX, with the air vents or passages 136 terminating short of such heat-dissipating and stress-neutralizing channel. By virtue of my recessed bustle block construction, I contemplate that it may be feasible to form the bustle blocks of less expensive refractory materials than those specified above, although the results will be better if such special materials be used.

It remains to be noted of the structures of Figs. II to XI that if the bustle or band of blocks at the rim of the tank should fail, the tank need not be withdrawn from service, for the tank is as safe and fit for operation as a new tank constructed in accordance with practice hitherto prevailing.

It will be understood that various modifications and elaborations of the structure described are permissible, without departing from the essence of the invention defined in the appended claims.

Notice is hereby given of an application, Serial No. 316,575, filed by me on January 31, 1940.

I claim as my invention:

1. In a glass furnace including a tank for a bath of molten glass, said tank having a refractory side wall protected at its rim by a peripherally extending course of refractory bustle blocks that are characterized by a relatively high resistance to the chemical and thermal effects of the molten glass in said bath; the improvement herein described in which said blocks include portions that overlie the glass-contacting surface of the tank side wall at the surface of the contained bath and include strain-neutralizing recesses that form air spaces between the body of the tank wall and the bodies of the blocks.

2. In a glass furnace including a tank for a bath of molten glass, said tank having a refractory side wall protected at its rim by a peripherally extending band of refractory blocks, each of said blocks including a horizontal body portion extending over said tank rim and a vertical body portion extending downward upon the glass-confining surface of such tank wall; the improvement herein described in which each of said blocks is rounded in the region of angular mergence of the two body portions thereof, affording a neutralizing of thermal strains in the blocks in service and an air space between the body of the tank side wall and the bodies of the blocks.

3. In a glass furnace including a tank for a bath of molten glass, said tank having a refractory side wall protected at its rim by a peripherally extending course of refractory bustle blocks that include horizontal body portions, and body portions extending downward therefrom over the glass-confining surface of such side wall; the improvement herein described in which said blocks include strain-neutralizing recesses that in the assembly form an air channel between the glass-contacting surface of the said course of bustle blocks and the surface of said hearth wall.

4. The structure of the next-preceding claim, in which air passages are formed in the horizontal body portions of said bustle blocks, which passages open between the surfaces of the tank wall and said horizontal portions to said air channel.

5. In a glass furnace including a tank for a bath of molten glass, said tank having a refractory side wall protected at its rim with a peripherally extending band of refractory blocks that include portions that extend downward from said rim and overlie the inner surface of the tank side wall at and below the metal line of said bath; the improvement herein described in which said blocks include strain-neutralizing recesses that form air spaces between the bath-contacting faces of said blocks and the body of said side wall, and passages that establish communication between said air spaces and the outer atmosphere.

6. In a glass furnace including a tank having assembled upon its side wall a band of wear-resisting apron blocks which extend downward on the internal surface of such side wall from a plane above to a plane below the normal metal line of the tank, the improvement herein described that comprises recesses severally formed in the bodies of said blocks, said recesses opening in the tank-surface-contacting faces of the blocks, with the effect that the bodies of the blocks form with the body of the tank wall a heat-dissipating air space.

7. In a glass furnace comprising a hearth having vertical side walls of refractory material adapted laterally to confine a bath of molten glass, a refractory roof arranged at an interval above said hearth side walls, and refractory jamb walls arranged between the roof and the rim of the side walls; the invention herein described that consists in a refractory belt or bustle borne upon the side walls of the hearth and extending peripherally of the rim of said side walls, said belt being formed of refractory blocks of greater specific gravity than the molten glass in said bath, said blocks including body portions that provide the glass-contacting face of the hearth at and immediately below the surface of the bath, and portions that extend upward from the rim of the tank in vertically bridging relation with respect to the lower edges of said jamb walls, the refractory bodies of said blocks being characterized by a relatively high resistance to erosion under the attrition and the thermal and chemical effects of the molten glass in said bath.

8. In a glass furnace comprising a hearth having a floor and side walls of refractory material adapted to sustain a bath of molten glass, a refractory roof arranged at an interval above said hearth, and refractory jamb walls arranged between the roof and the rim of the hearth; the invention described herein that consists in a refractory belt or bustle borne upon and extending peripherally of the rim of said hearth, said belt or bustle being formed of refractory blocks including body portions that extend downward below the plane of the surface of the molten bath sustained on the hearth and provide the immediate glass-contacting face of the hearth at such plane, said blocks also including body portions that extend upward from such plane and bridge the regions between the lower edges of said jamb walls and the rim of said hearth, the refractory bodies of said blocks being characterized by a relatively high resistance to erosion under the attrition and the thermal and chemical effects of the molten glass in said bath.

9. In a glass furnace comprising a hearth having a floor and side walls of refractory material adapted to sustain a bath of molten glass, a refractory roof arranged at an interval above said hearth, and refractory jamb walls arranged between the roof and the rim of the hearth; the invention described herein that comprises a refractory belt or bustle that extends peripherally of the rim of the hearth, that vertically bridges the regions between the lower edges of said jamb walls and the rim of said hearth, and that extends downward, as viewed in cross section, below the plane of the surface of the bath of molten glass, the refractory body of said belt or bustle being characterized by a relatively high resistance to erosion under the attrition and the thermal and chemical effects of the molten glass in said bath.

10. In a glass furnace comprising a hearth having a floor and side walls of refractory material adapted to sustain a bath of molten glass, a refractory roof arranged at an interval above said hearth, and refractory jamb walls arranged between the roof and the rim of the hearth; the invention described herein that comprises a refractory belt or bustle that extends peripherally of the rim of the hearth, that vertically bridges the regions between the lower edges of said jamb walls and the rim of said hearth, and that bellies inward of the side walls of the hearth, as viewed in cross section, and extends downward below the plane of the surface of the bath of molten glass, the refractory body of said belt or bustle being characterized by a relatively high resistance to erosion under the attrition and the thermal and chemical effects of the molten glass in said bath.

11. In a glass furnace comprising a hearth having a floor and side walls of refractory material adapted to sustain a bath of molten glass, a refractory roof arranged at an interval above said hearth, and refractory jamb walls arranged between the roof and the rim of the hearth; the invention described herein that comprises a belt or bustle formed of refractory blocks, said belt or bustle extending peripherally of the rim of said tank, and said blocks including tuck portions that extend upward from the rim of the hearth and cover the regions between such rim and the lower edges of said jamb walls, and apron portions that extend downward from the rim of the hearth and provide the immediate glass-contacting face of the hearth in the plane of the surface of said bath, the refractory bodies of said blocks being characterized by a relatively high resistance to erosion under the attrition and the thermal and chemical effects of the molten glass in said bath.

12. A bustle block for glass furnaces, said block comprising a body formed of refractory material that is resistant to erosion under the attrition and the thermal and chemical effects of a bath of molten glass and that is of greater specific gravity than such molten glass, said block including a body portion adapted, when grouped with like blocks in assembly upon the rim of a furnace hearth, to provide in the hearth a glass-contacting belt or bustle at and below the surface of the bath, and a body portion extending upward from such bustle-forming portion for the purpose described.

13. A refractory block for assembly upon the rim of a glass-furnace hearth, said block comprising a body formed of refractory material that is resistant to erosion under the attrition and the thermal and chemical effects of a bath of molten glass, the body of said block including an apron portion adapted to extend downward from the rim of a hearth upon which it may be assembled and to provide an inner glass-contacting face of the hearth at the normal surface level of the bath sustained thereby, and a tuck portion extending upward from such apron portion.

14. A block for use in the construction of glass furnaces including a hearth and jamb walls above the rim of the hearth, said block comprising a body formed of refractory material that is resistant to erosion under the attrition and the thermal and chemical effects of a bath of molten glass, said block including a body portion adapted, when grouped with like blocks in assembly upon the rim of a glass-furnace hearth and below the jamb walls thereof, to provide in the hearth a glass-contacting belt or bustle at the surface of the bath, said block also including a body portion extending upward from such bustle-forming portion for the purpose described, and a portion extending angularly therefrom and adapted in service to nest between the rim of said hearth and the jamb wall above such rim.

15. A block for use in the construction of glass furnaces including a hearth and jamb walls above the rim of the hearth, said block comprising a body formed of refractory material that is resistant to erosion under the attrition and the thermal and chemical effects of a bath of molten glass, said block including a body portion adapted, when grouped with like blocks in assembly upon the rim of a glass-furnace hearth and below the jamb walls thereof, to provide in the hearth a glass-contacting belt or bustle at the surface of the bath, said block also including a body portion extending laterally from said bustle-forming portion and adapted in service to nest between the rim of said hearth and the jamb wall above such rim.

JOSEPH C. KEANEY.